United States Patent [19]

Kennedy

[11] Patent Number: 4,953,582

[45] Date of Patent: Sep. 4, 1990

[54] COMBINED PRESSURE REGULATOR AND RELIEF VALVE HAVING A SINGLE BIASING MEANS

[75] Inventor: Lawrence C. Kennedy, Birmingham, Mich.

[73] Assignee: Detroit Diesel Corporation, Detroit, Mich.

[21] Appl. No.: 385,400

[22] Filed: Jul. 27, 1989

[51] Int. Cl.$^5$ ............................................. G05D 16/00
[52] U.S. Cl. ..................................... 137/115; 137/116; 137/569; 137/881; 137/885
[58] Field of Search .................. 137/115, 505.11, 885, 137/878, 881, 117, 569, 116

[56] References Cited

U.S. PATENT DOCUMENTS 3,375,844 4/1968 Mercier .......................... 137/490 X
4,302,937 12/1981 Aubert ....................... 137/505.11 X Primary Examiner—Alan Cohan
Attorney, Agent, or Firm—Reising, Ethington, Barnard, Perry & Milton

[57] ABSTRACT

A pressure regulator and relief valve including a valve body, a first regulating valve moveable between first and second positions in response to a predetermined gallery pressure for regulating the pressure of a fluid, a second relief valve moveable between first and second positions in response to a predetermined relief pressure of a fluid and a single spring disposed within the valve body for biasing both the first regulating valve and the second relief valve to their respective first positions within the valve body.

10 Claims, 3 Drawing Sheets

COMBINED PRESSURE REGULATOR AND RELIEF VALVE HAVING A SINGLE BIASING MEANS

TECHNICAL FIELD

This invention relates to combined pressure regulator and relief valves for use in hydraulic circuits to regulate the overall system pressure and to limit the maximum hydraulic pressure below a predetermined value.

DESCRIPTION OF THE PRIOR ART

Mechanical regulator and safety relief valves are commonly known in the art and are often employed in conjunction with hydraulic pumps that are used for lubrication, cooling and operation and control of machinery. Early on in the development of this technology, either two completely separate valves were disposed at different points along the hydraulic circuit or both valves were housed in a single valve body to handle the regulating function and the safety relief function. Examples of such valving systems can be found in U.S. Pat. No. 2,633,861 issued to Gardiner on April 7, 1953; U.S. Pat. No. 3,349,714 issued to Grenier on Oct. 31, 1967 and U.S. Pat. No. 3,411,416 issued to Herd et al on Nov. 19, 1968.

As this technology evolved, more efficient designs were introduced. For example, U.S. Pat. No. 4,598,730 issued to Nakamura et al on July 8, 1986 discloses a flow control valve including coaxial regulating and relief valves which are both disposed at a single bore and housed in a single valve body. However, the flow control valve of Nakamura et al and those presently known in the art generally include regulating valves and relief valves which are diametrically opposed with respect to one another and which are displaced in opposite directions with respect to one another. This arrangement necessitates the use of complex porting in the valve body so that each valve may be responsive to a separate predetermined pressure. Further, these designs incorporate the use of a two biasing means for biasing each valve body to its closed position.

The subject invention overcomes these deficiencies in the prior art in a compact, efficient and cost effective combined pressure regulator and relief valve which has less moving parts and is more reliable then the valves disclosed in the prior art.

SUMMARY OF THE INVENTION AND ADVANTAGES

The subject invention is directed toward a combined pressure regulator and relief valve assembly having a valve body including a bore disposed within the body. The assembly further includes a first regulating valve moveable between first and second positions in response to a predetermined gallery pressure for regulating the pressure of a fluid and a second relief valve moveable between first and second positions in response to a predetermined relief pressure of a fluid. Finally, the assembly includes a single valve biasing means for biasing both the first regulating valve and the second relief valve to their respective first positions within the valve body.

Accordingly, the subject invention overcomes the problems of the prior art by including a combined pressure regulating and relief valve having a single biasing means for biasing both of the regulating and relief valves to their respective first positions and thus share a common valve spring, spring seat and spring retainer. As a result, the combined pressure regulating and relief valve of the subject invention incorporates a reduction in the total number of components required for the two separate valve assemblies and is therefore more cost effective then the valves of the prior art, is more compact and mechanically efficient and therefore requires less space then the valves of the prior art, and, because the subject invention results in a reduction of the number of critical components, it is more reliable then the valves disclosed in the prior art.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
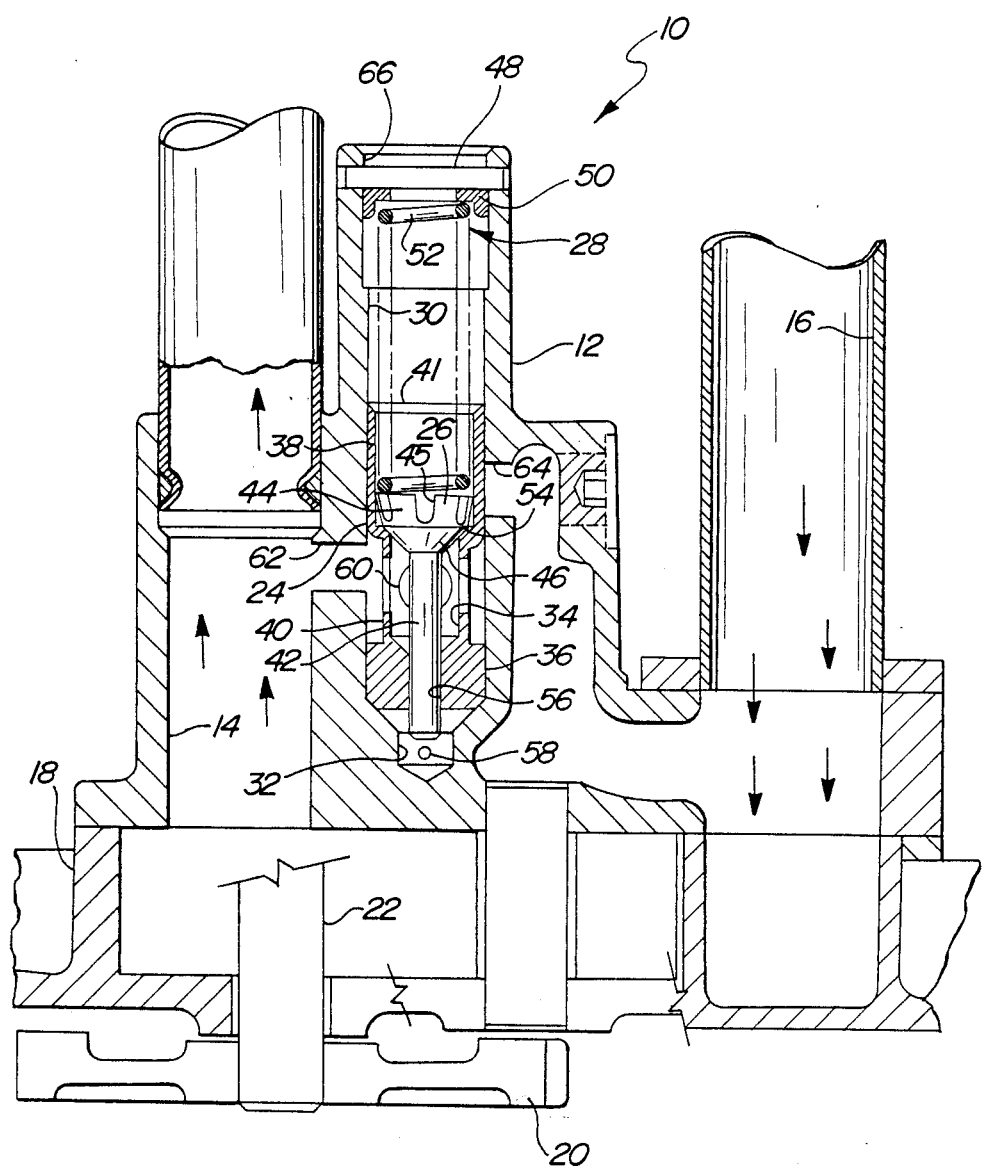
FIG. 1 is a cross-sectional side view of the combined pressure regulating and relief valve.

A combined pressure regulating and relief valve assembly of the subject invention is generally shown at 10 in FIG. 1. The assembly includes a valve body 12 which is disposed generally between a hydraulic pump discharge passage 14 and the pump inlet passage 16. The valve body 12 may be integral with the hydraulic pump housing 18 or its cover, or it may be separate therefrom and fixedly attached to the pump housing 18 by bolts or any fastener commonly known in the art. The inlet passage 16 delivers a fluid to a hydraulic pump (not shown) which, in turn, is driven by a pump drive gear 20 through shaft 22. One application of the subject invention is in conjunction with oil pumps used in internal combustion engines or with heavy machinery for pumping oil to lubricate and cool moving parts. Typically, oil is pumped from the oil pump through the discharge passage 14 to an oil filter (not shown). The oil then passes through an oil cooler and then on to the main system gallery or reservoir from which the oil is dispersed to lubricate and cool any number of moving parts. For example, the oil may be distributed through a bore in the crank shaft, from the crank shaft to the main bearing which support the crank shaft and also through passages in the crank shaft to connecting rods and then on the connecting rod bearing etc.

The assembly 10 further includes a first regulating valve 24 moveable between first and second positions in response to a predetermined gallery pressure of the main system gallery or reservoir for regulating the pressure of a fluid at a point from which the fluid is further disbursed to lubricate and cool various moving parts. A second, relief valve 26 is moveable between the first and second positions in response to a predetermined pressure of a fluid at the pump outlet or the pump discharge passage 14 to protect the pump and its mechanical drive system from hydraulic overload during times of excessive pump discharge pressure head. The assembly 10 also includes a valve biasing means, generally indicated at 28, for biasing both the first, regulating valve 24 and the second, relief valve 26 to their respective first positions within the valve body 12. To this end, the valve body 12 includes a bore 30 and the first regulating valve 24 and the second relief valve 26 are disposed within the bore 30 with both valves 24, 26 being displaced in the same direction when they are moved to their respective second positions. More specifically, the first, regulating valve 24 and the second, relief valve 26 are disposed coaxial with respect to one another in the valve body bore 30 with the second, relief valve 26 being disposed within and supported by the first, regulating valve 24 as will be described in further detail below.

A first regulating chamber means 32 is in fluid communication with the predetermined gallery pressure derived from the main system gallery or reservoir for acting on the first regulating valve 24 to move the regulating valve 24 from its first position to its second position. In addition, a second relief chamber means 34 is in fluid communication with the predetermined relief pressure derived from the pump discharge pressure head for acting on the relief valve 26 to move the relief valve from its first position to its second position. The biasing means 28 exerts a single predetermined force to bias both the regulating valve 24 and the relief valve 26 to their respective first positions. However, the biasing means 28 is responsive to both the predetermined gallery pressure and the predetermine relief pressure to allow the first, regulating valve 24 to move to its second position independently of the relief valve 26 and further to allow the relief valve 26 to move to its second position independent of the regulating valve 24.

In the preferred embodiment, the first regulating valve 24 is a hollow spool having first and second ends 36, 38 respectively which define one diameter and a center portion 40 having a reduced diameter with respect to the diameter of the first and second end 36, 38. The second end 38 of the hollow spool presents an opening 41. The second relief valve 26 is in the form of a poppet valve having a stem portion 42, a crown portion 44 having openings or flutes 45 and a frustoconical portion 46 interconnecting the crown portion 44 and the stem portion 42. The biasing means 28 includes a retaining pin 48 extending across the valve body bore 30 and a collar 50 retained by the underside of the pin 48. The biasing means 28 further includes a coiled spring 52 acting between the collar 50 and the fluted crown 44 of the poppet valve 26 through the opening 41 in the second end 38 of the spool to apply a predetermined force to the poppet valve 26 and to the spool valve 24 through the poppet valve 26 to bias both of the valves 24, 26 to their first positions.

The reduced diameter of the center portion 40 presents a bevelled valve seating surface 54 at one end thereof for supporting the frustoconical portion 46 of the poppet valve 26 in sealing contact within the center portion 40 of the hollow spool valve 24 when the poppet valve 26 is biased by the coil spring 52 to its first position. In this way, the second, relief poppet valve 26, as supported by the center portion 40, allows no fluid to pass through the fluted portions 45 of the crown 44 until the pressure at the pump discharge passage 14 has reached a predetermined relief pressure.

The first end 36 of the spool valve 24 includes a stem bore 56 extending therethrough and having a smaller diameter then the reduced diameter of the center portion 40. The stem 42 of the poppet valve 26 is slideably supported in the stem bore 56 and adds stability to the movement of the poppet valve 26 as the poppet valve moves between its first and second positions.

The valve body bore 30 includes a gallery port 58 disposed at one end thereof. The first, regulating chamber means includes a regulating chamber 32 which is formed by the valve body bore 30 and the first end 36 of the spool 24. The gallery port 58 provides fluid communication between a first fluid pressure source derived at the main system gallery or reservoir and the first regulating chamber 32 by means of a series of passages or lines as is commonly known in the art. In this way, the main system gallery pressure may act against the first end 36 of the spool 24 to move the spool 24 from its first position to its second position when the main system gallery pressure has reached a predetermined gallery pressure. Similarly, the second, relief chamber means includes a relief chamber 34 defined by the center portion 40 of the hollow spool 24. Further, the center portion 40 includes a plurality of fluid communicating apertures 60 disposed in the periphery of the reduced diameter of the center portion 40 for providing fluid communication into the relief chamber 34 and through the center portion 40 of the hollow spool 24.

Figure 2:
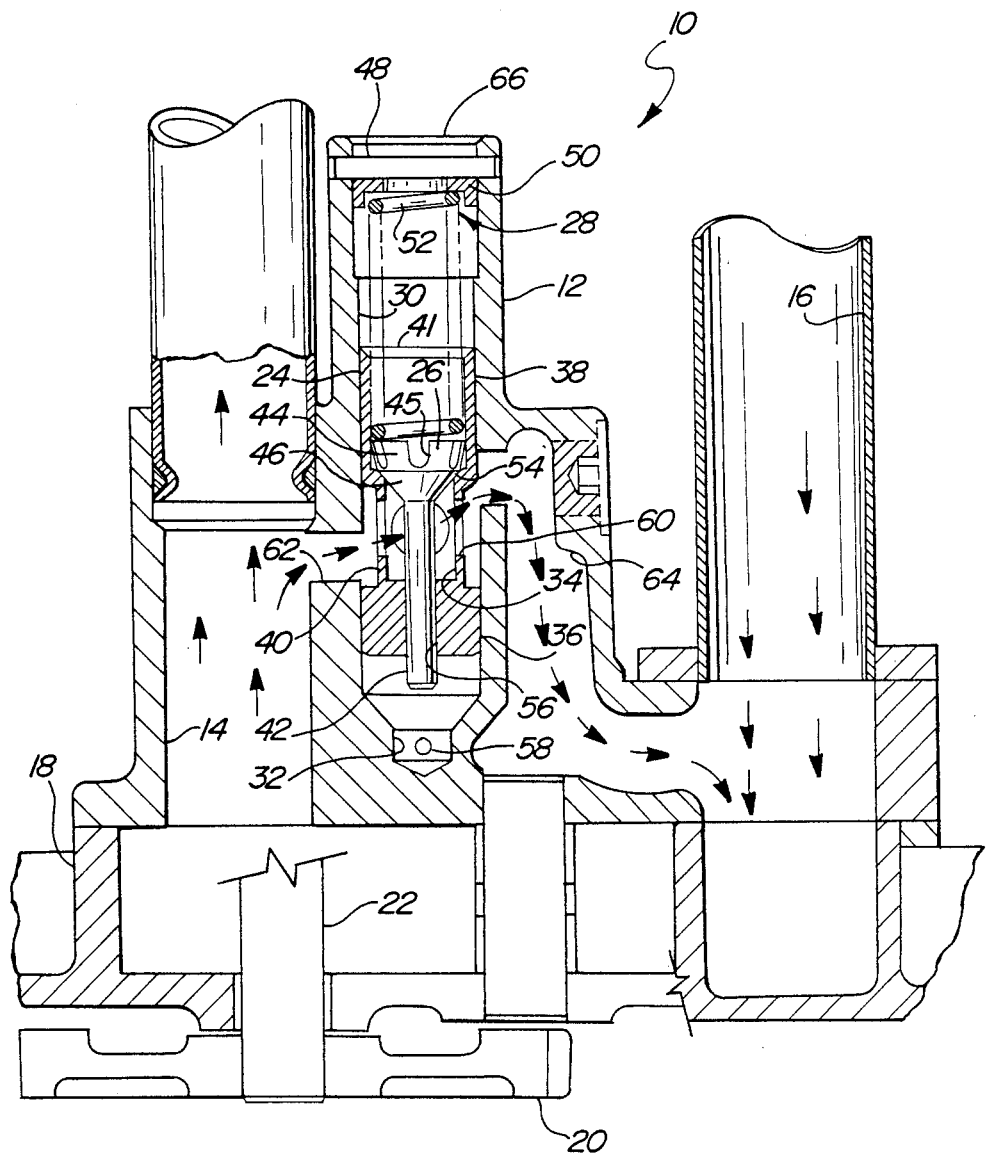
FIG. 2 is a cross-sectional side view of the combined pressure regulating and relief valve with the regulating valve displaced to its second and open position.

The valve body 12 includes an inlet passage 62 extending between the pump discharge passage 14 and the valve body bore 30 for providing fluid communication between the pump discharge passage 14 and the relief chamber 34. An outlet passage 64 extends between the valve body bore 30 and the pump inlet passage 16 for providing fluid communication between the relief chamber 34 and the pump inlet passage 16. In other words, and as illustrated in FIG. 2, the fluid communicating apertures 60 of the center portion 40 of the spool valve 24 provide fluid communication between the pump discharge passage 14 through the valve body inlet passage 62, into the relief chamber 34 and out the valve body outlet passage 64 when the spool is moved from its first position to its second position in response to the predetermined gallery pressure acting on the first end 36 of the spool valve 24 at the regulating chamber 32. Further, it should be noted that when spool is disposed in this position, fluid may also flow around the reduced diameter of the center portion 40 between the inlet passage 62 and the outlet passage 64.

Figure 3:
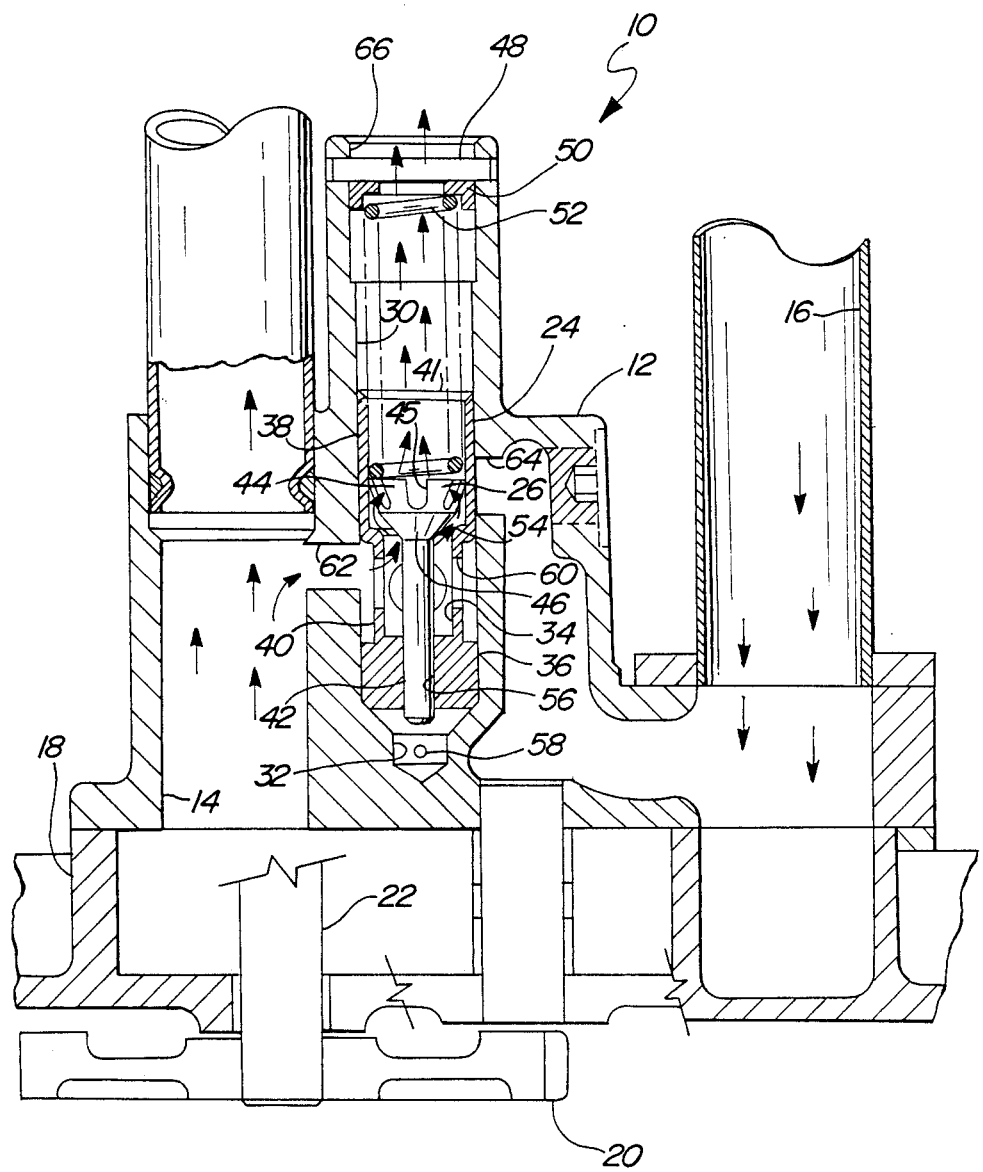
FIG. 3 is a cross-sectional side view of the combined pressure regulating and relief valve with the relief valve displaced to its second and open position.

Further, and as shown in FIG. 3, the fluid communicating apertures 60 of the center portion 40 provides fluid communication between the pump discharge passage 14 through the inlet passage 62 and into the relief chamber 34 defined by the center portion 40 when the spool is in its first position to act on the frustoconical portion 46 of the poppet valve 26 to move the poppet valve 26 to its second position away from the bevelled valve seal 54 in response to the predetermined relief pressure derived at the pump discharge passage 14. The valve body bore 30 includes an opening 66 at the end opposite to the regulating chamber 32. The fluid passes from the relief chamber 34 of the center portion 40 of the hollow spool past the bevelled valve seat surface 54 presented by the center portion 40 of the spool through the flutes or openings 45 in the crown portion 44 of the poppet valve 26 out through the opening 41 in the second end 38 of the spool, and into the valve body bore 30. From the bore 30 the fluid passes out through the opening 66 in the bore 30 when the poppet valve 26 is moved from its first position to its second position. It should be noted, however, that the pump discharge pressure has no direct effect to cause the regulating spool valve 24 to move against the force of the spring 52 because the pump pressure is applied equally to opposite faces of the relief chamber 34 of the center portion 40 of the spool 24 resulting in offsetting forces. Only the system gallery pressure operating against the first end 36 of the spool valve at the regulating chamber 32 can cause the spool valve 24 to move to its second position.

In its operative mode, in for example an internal combustion engine, and during normal operating conditions, both valves 24 and 26 are biased to their first position and are therefore closed as shown in FIG. 1. However, when the main system gallery pressure exceeds a predetermined level, this pressure will be translated to the gallery port 58 into the regulating chamber 32 and act on the first end 36 of the spool valve 24 to move the spool valve 24 through the poppet valve 26 which it supports against the single biasing force of the spring 52 and independently of the poppet valve 26 as shown in FIG. 2. In this way, some fluid flowing through the pump discharge passage 14 may be vented through the inlet passage 62, through the aperture 60, into the relief chamber 34 and then out another aperture 60, and also around the outside of the reduced diameter center portion 40 of the spool, through the outlet passage 64 and back into the pump inlet 16. The pressure at the pump discharge passage 14 is thereby reduced causing a reduction in the pressure in the main system gallery or reservoir which is downstream of the pump discharge passage as described above. The pressure regulating spool valve 24 thus regulates fluid pressure to the desired level for the elements to be cooled and lubricated which are located downstream of the main system gallery.

Similarly, and as can happen during a cold start up of an internal combustion engine where a fluid such as oil can be very viscous, pressure may build up at the pump discharge passage due to the large pressure drop across both the downstream filter and oil cooler. As shown in FIG. 3, when the pressure exceeds a predetermined level, it will cause the poppet valve 26 to unseat from the bevelled surface 54 and move to its second and open position, independent of the spool valve 24. The fluid is then vented from the discharge passage 14 through the relief chamber 34, past the flutes 45 in the crown 44, through the opening 41 in the second end 38 of the spool and into the bore 30 of the valve body 12. The fluid may then pass through the opening 66 in the end of the bore 30 and may be vented downstream to the sump reservoir. In this way, the relief valve protects the pump and its mechanical drive systems from hydraulic overload during times of excessive pump discharge.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed:

1. A pressure regulation and relief valve assembly comprising;

a valve body including a bore;

a regulating valve comprising a hollow spool having first and second ends defining one diameter, a center portion having a reduced diameter with respect to said first and second ends and including a relief chamber defined by the center section of said hollow spool;

a poppet relief valve having a stem portion, a fluted crown portion and a frustoconical portion interconnecting said crown portion and said stem portion, said poppet valve being disposed within said regulating valve and said regulating valve being disposed within said bore, said regulating valve being movable between closed and open positions in response to a predetermined gallery pressure, said relief valve being moveable between said closed and open positions in response to a predetermined relief pressure;

a single biasing means within said valve body for biasing said regulating valve and relief valve to closed positions said valves being located at the same end of said biasing means, said biasing means exerting a predetermined force to bias both of said valves toward said closed position and being responsive to both said predetermined gallery pressure and said predetermined relief pressure to allow said first regulating valve move to said open position and said relief valve to move to said second position.

2. An assembly as set forth in claim 1 further characterized by said biasing means including a retaining pin extending across said valve body bore and a collar retained by the underside of said pin said biasing means further including a coiled spring acting between said collar and said fluted crown of said poppet valve to apply a predetermined force to said poppet valve and to said spool valve through said poppet valve to bias said valves to said closed positions.

3. An assembly as set forth in claim 2 further characterized by said center portion presenting a bevelled surface at one end thereof for supporting said frustoconical portion of said poppet valve within said center portion of said hollow spool valve.

4. An assembly as set forth in claim 3 further characterized by said first end of said spool including a stem bore extending therethrough and having a smaller diameter than said center portion, said stem of said poppet being slideably supported in said stem bore.

5. An assembly as set forth in claim 4 further characterized by said valve body bore including a gallery port, said first regulating chamber means including a regulating chamber and being formed by said valve body bore and said first end of said spool, said gallery port providing fluid communication between a first fluid pressure source and said first regulating chamber so that said first fluid source may act against said first end of said spool to move said spool from said closed position to said open position when said fluid pressure source has reached said predetermined gallery pressure.

6. An assembly as set forth in claim 5 further characterized by said center portion including a plurality of fluid communicating apertures disposed in said reduced diameter of said center portion for providing fluid communication into said relief chamber and through said center portion of said hollow spool.

7. An assembly as set forth in claim 6 further characterized by said valve body including an inlet passage extending between a pump discharge passage and said valve body bore for providing fluid communication between a pump discharge passage and said valve body bore and an outlet passage extending between said valve body bore ad a pump inlet passage for providing fluid communication between said valve body bore and said pump inlet passage.

8. An assembly as set forth in claim 7 further characterized by said fluid communicating apertures of said center portion of said spool providing fluid communication between said pump discharge passage and said pump inlet passage through said valve body inlet passage and said valve body outlet passage when said spool is moved from said closed position to said open position in response to said predetermined gallery pressure acting on said first end of said spool at said regulating chamber.

9. An assembly as set forth in claim 8 further characterized by said fluid communicating apertures of said center portion of said spool providing fluid communication between said pump discharge passage through said inlet passage and into said relief chamber defined by said center portion of said hollow spool when said spool is in said closed position to act on said frustoconical portion of said poppet to move said poppet to said open position in response to said predetermined relief pressure.

10. An assembly as set forth in claim 9 further characterized by said valve body bore including an opening at an end opposite to said regulating chamber, said fluid passing from said relief chamber of said center portion of said hollow spool past said bevelled surface presented by center portion of said spool through said fluted crown portion of said poppet and into said valve body bore out through said opening in said bore when said poppet valve is moved from said closed position to said open position.

* * * * *